United States Patent [19]

Evenchik

[11] 4,171,467
[45] Oct. 16, 1979

[54] SIGNAL MULTIPLEXING CIRCUIT

[75] Inventor: Leonard N. Evenchik, Lorain, Ohio

[73] Assignee: Bell Telephone Laboratories, Incorporated, Murray Hill, N.J.

[21] Appl. No.: 926,421

[22] Filed: Jul. 20, 1978

[51] Int. Cl.² ............................................... H04J 3/00
[52] U.S. Cl. ........................... 179/15 BM; 179/15 A; 179/2 DP; 179/15 AW
[58] Field of Search .............. 179/15 R, 15 A, 15 AP, 179/15 AW, 15 BM, 15 FD, 2 DP, 3

[56] References Cited

U.S. PATENT DOCUMENTS

| | | | |
|---|---|---|---|
| 3,165,590 | 1/1965 | Brook et al. | 179/84 R |
| 3,553,386 | 1/1971 | Golembeski | 179/84 T |
| 3,701,854 | 10/1972 | Anderson | 179/18 AD |

Primary Examiner—Thomas W. Brown
Assistant Examiner—Joseph A. Popek
Attorney, Agent, or Firm—James M. Graziano

[57] ABSTRACT

The disclosed signal multiplexing circuit makes use of a single pair of wires to interface a data and voice communication circuit such as an electronic key telephone (EKT) station set with a central data and voice communication system such as a business communication system (BCS). The signal multiplexing circuit transmits outgoing standard voice signals, outgoing data and outgoing auxiliary signals and, in turn, simultaneously receives incoming standard voice signals, incoming data and incoming auxiliary signals on the single pair of wires. Both time division and frequency separation techniques are concurrently employed to achieve multiple use of the single pair of wires without crosstalk between the plurality of signals. The data signals are transmitted as bipolar bit pairs preceded by a data start pulse pair. The transmission of an outgoing data bipolar pulse pair is delayed until the incoming pulse pair has cleared the line, thus separating incoming and outgoing data in time.

7 Claims, 7 Drawing Figures

| FIG.3 | FIG.4 |
|---|---|
|  | FIG.5 |
|  | FIG.6 |

SIGNAL MULTIPLEXING CIRCUIT

CROSS REFERENCE TO RELATED APPLICATIONS

This application is related to application Ser. No. 926,422 of R. L. Carbrey entitled "Signal Multiplexing Circuit," filed on the same date hereof, which application teaches the general concept of the disclosed signal multiplexing system.

FIELD OF THE INVENTION

This disclosed invention relates to combined data and voice communication systems and in particular to a signal multiplexing circuit which transmits and receives voice signals, data, auxiliary signals between a central communication system and a remote communication circuit via a single pair of wires.

DESCRIPTION OF THE PRIOR ART

There have been a number of prior art patents concerning the use of a single pair of wires to carry more than one type of signal. U.S. Pat. No. 3,165,590 issued Jan. 12, 1965 to C. E. Brooks et al. teaches utilizing a single pair of wires to transmit both ringing signals and voicce paging signals in a single direction to a telephone station set. The voice paging signals are simply transmitted over the pair of wires during the silent interval of ringing, thereby providing a simple form of voice paging. U.S. Pat. No. 3,553,386 issued Jan. 5, 1971 to J. J. Golembeski teaches a paging arrangement wherein an FM signal is used to provide voice paging to a telephone station set while a dual frequency tone ringing signal is also sent to the telephone station set. This is essentially a frequency separation scheme which enables the telephone station set to distinguish between the two signals. Additionally, there are numerous prior art patents teaching various time division techniques to multiplex a number of signals together into a single composite unidirectional signal.

Thus, there are numerous prior art signaling arrangements wherein two separate signals are transmitted in the same direction on a single pair of wires. The methos employed to accomplish this are either time division switching, frequency separatin of signals, or simply utilizing signals that don't overlap in time. These signal multiplexing techniques generaly require extensive circuitry to implement and great care must be taken to avoid crosstalk between the various signals. Additionally, these prior art signal multiplexing arrangements are generally unidirectional communication schemes and no provisions are made for bidirectional communication on the single pair of wires.

These limitations are especially pertinent in the case of electronic key telephone station sets. In addition to standard voice signals, electronic key telephone (EKT) station sets receive an input data stream from the business communication system (BCS) to control the ringer and to define which lamps on the station set are to be lighted. The electronic key telephone station set in turn generates an output data stream which is transmitted to the business communication system to define the status of the switchook, key buttons, and TOUCH-TONE ® buttons. These prior art electronic key telephone station sets require the use of six wires, one pair for standard voice signals, one pair for data from the business communication system to the electronic key telephone station set, and one pair for data from the electronic key telephone station set to the business communication system.

However, in viewing the details of the EKT station set operation, it becomes apparent that the six wires between the EKT station set and the BCS are not utilized to their full capacity. For example, the input and output data signals comprise short bursts of data followed by long intervals (from a data transmission standpoint) of silence. It would therefore be advantageous to eliminate the two pairs of wires used for data communication and instead transmit all signals on a single pair of wires. However, this would entail concurrently transmitting six separate and distinct signals, three in each direction, on the single pair of wires between the EKT station set and the BCS.

SUMMARY OF THE INVENTION

In accordance with my invention, I provide a signal multiplexing circuit that employs only a single pair of wires to concurrently transmit a plurality of signals without crosstalk between the various signals. This is advantageous in many situations and, for example, would enable the residential telephone lines to be used for data communication without interfering with the normal bidirectional voice communication. Thus, conceptually, a residential customer could be provided with a terminal for accessing a centrally located data communication system, such as a computer, via the residence telephone line while also permitting the residence telephone line to be used in standard fashion for voice communication.

There are a multitude of alternative uses for such a signal multiplexing circuit and the preferred embodiment disclosed herein illustrates an application wherein an electronic key telephone station set is connected to a business communication system via a single pair of wires. The single pair of wires carries the standard bidirectional voice signal, the electronic key telephone station set input and output data streams, as well as a bidirectional auxiliary signal to and from the BCS, which signal may be anything from data to hands-free answer voice signals. This is accomplished by concurrently separating the six distinct signals from each other in both frequency and time. The standard bidirectional voice sigals are directly transmitted on the communication pair and comprise audio signals in the voice frequency band. The input and output data streams comprise periodic bursts of bipolar pulses of Pulse Amplitude Modulation (PAM) preceded by a positive pulse to identify the data transmission. The bidirectional auxiliary signals comprise bipolar pulses of Pulse Width Modulation (PWM) transmitted on the communication pair during the silent interval between successive input and output data stream PAM data bursts.

Separation of the input and output data signals and the bidirectional auxiliary signals from the standard bidirectional voice signals is advantageously accomplished by formatting the data signals so that they have little energy within the audio band. The data signals are transmitted as bipolar bit pairs preceded by a data start pulse pair. Therefore, each bit pair has a net energy of zero when averaged over the full cycle. By using a pair duration which is short compared to the audio frequencies and data bursts which are short compared to the time between bursts, the data signal spectrum will be concentrated principally in a band around the frequency corresponding to the pair duration, its harmonics, and the frequency corresponding to half the pair frequency. Minimal filtering is therefore required to suppress the products falling in the normal audio band.

The input and output data streams and the bidirectional auxiliary signals are separated from each other in time so that they are mutually exclusive, with only one set of these signals appearing on the communication pair at a time. Thus, the appearance of a positive lead pulse is all that is needed to identify the input and output data streams and distinguish them from the bidirectonal auxiliary signals.

The incoming data bipolar pulse pairs are also separated from the outgoing data bipolar pulse pairs in time. In particular, the transmission of an outgoing data bipolar pulse pair is delayed until the incoming pulse pair has cleared the line. Thus, the disclosed signal multiplexing circuit acts as a "time hybrid" for data signals, separating incoming and outgoing data in time. The incoming and outgoing auxiliary bipolar pulse pairs are handled in similar "time hybrid" fashion. Thus, the disclosed signal multiplexing circuit interleaves the incoming and outgoing data and auxiliary signal bipolar pulse pairs in time to prevent any of these signals from overlapping. Therefore, the signal multiplexing circuit of the present invention provides six separate signals on a single pair of wires with little modification of the existing electronic key telephone station set signaling format. The standard bidirectional voice signals are separated from the high frequency input and output data streams and bidirectional auxiliary signals by a low pass filter and the input and output data streams are differentiated from the bidirectional auxiliary signals by the presence of a leading positive pulse.

BRIEF DESCRIPTION OF THE DRAWING

The operation and utilization of the present invention will be more fully apparent from the following description of the drawing in which.

GENERAL DESCRIPTION —FIG. 1

Figure 1:
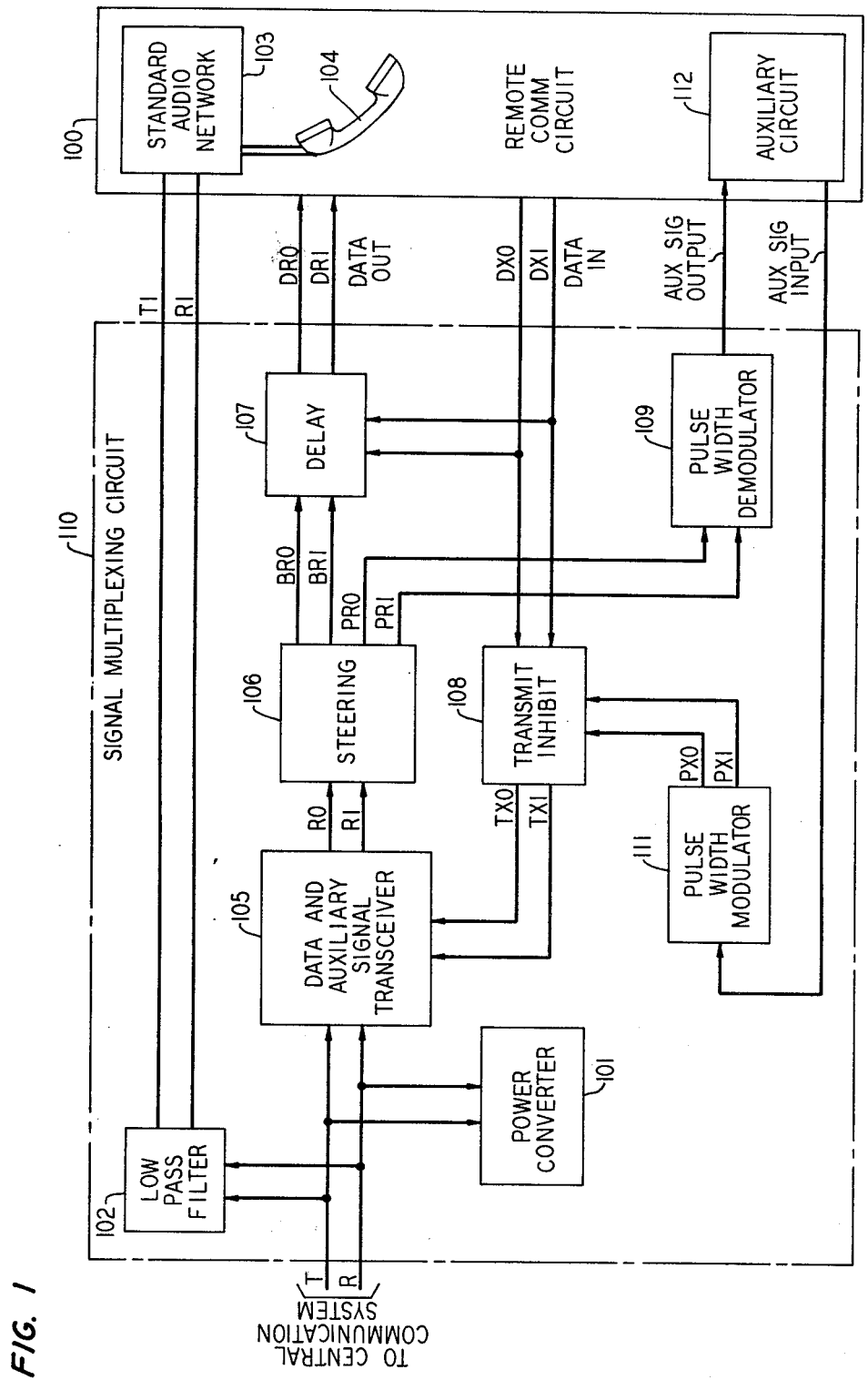
FIG. 1 illustrates one embodiment of my invention in block diagram form.

FIG. 1 shows the disclosed signal multiplexing circuit in block diagram form wherein signal multiplexing circuit 110 is associated with a remote communication circuit 100, which, in this particular disclosed application is assumed to be a telephone station set 100 which is connected to a telephone switching system (not shown) by the communication pair comprised of leads T and R. Telephone station set 100 is, for the purpose of this disclosure, assumed to be an electronic key telephone (EKT) station set although the signal multiplexing circuit of my invention may be employed with any data and voice communication circuit that processes similar signals such as a data and voice communication system for interfacing a residence telephone line with a computer. Electronic key telephone station sets are well known in the art and U.S. Pat. No. 3,701,854 issued Oct. 31, 1972 to Anderson et al. illustrates a typical prior art EKT station set. For the purpose of this disclosure, it will be assumed that EKT station set 100 receives and transmits standard bidirectional voice signals in addition to a data stream comprised of bursts of bipolar pulse pairs. Additionally, it will be assumed that bidirectional auxiliary signals are also processed by signal multiplexing circuit 110. As discussed above, these auxiliary signals can be either data or voice signals and, for the purpose of this disclosure, it will be assumed that these signals comprise hands-free answer voice signals. These hands-free answer voice signals generally would comprise a paging signal from the BCS attendant to the subscriber at EKT station set 100, with the subscriber having the capability of responding to the paging signal hands-free. The equipment necessary to provide this capability in EKT station set 100 is well-known in the art and generally would comprise a voice switch, loudspeaker, and a microphone, which circuitry is shown as auxiliary circuit 112 on FIG. 1.

It is obvious from this description that the central data and voice communication system connected to the other end of the communication pair must also employ analogous signal multiplexing circuitry to transmit and receive the above-mentioned signals on the communication pair in the format described. While it is beyond the scope of this description to pursue, in detail, the exact structure employed therein, suffice it to say that most of signal multiplexing circuit 110 can be directly applied to that application. Of course, clock circuits would be needed to provide the timing signals that signal multiplexing circuit 110 derives from the received signal, but this and any other adaptations necessary are straightforward modifications to the disclosed signal multiplexing circuit.

Signal multiplexing circuit 110 eliminates the necessity of employing six wires to connect EKT station set 100 to the business or other data communication system. Instead, signal multiplexing circuit 110 employs only a single pair of wires which are used by the business communication system to transmit standard voice signals, data, as well as an auxiliary signal. This is accomplished by concurrently employing both time division and frequency separation techniques to transmit all the above-mentioned signals on the single pair of wires.

The standard bidirectional voice signals are directly transmitted on the communication pair and comprise audio signals in the voice frequency band. The input and output data streams comprise periodic bursts of 100 kHz bipolar pulse pairs of Pulse Amplitude Modulation (PAM) preceded by a positive pulse pair to identify the data transmission. The bidirectional auxiliary signal comprises 100 kHz bipolar pulse pairs, with a leading negative pulse, of Pulse Width Modulation (PWM) transmitted between the input and output data stream PAM data bursts.

Signal multiplexing circuit 110 contains a power converter 101 which obtains power from the communication pair (leads T and R) by converting the battery voltage appearing thereon to the bias voltage levels required by the various circuits that comprise signal multiplexing circuit 110. Low pass filter 102 is connected to the communication pair and serves to pass only the low frequency standard bidirectional audio signals appearing thereon to standard audio network 103 and handset 104 of EKT station set 100. The data and auxiliary signals are received and transmitted by data and auxiliary signa transceiver 105. The received data and auxiliary signals are forwarded to steering circuit 106 wherein the auxiliary signals are separated from the data with the auxiliary signals going to pulse width demodulator 109, which converts the received auxiliary signals to the required output signal. The data signals in turn, go to delay circuit 107 which interfaces the data signals with the existing EKT station set data circuitry.

The EKT station set meanwhile provides output data to transmit inhibit circuit 108 and outgoing auxiliary signals to pulse width modulator 111, which converts the auxiliary signals to an appropriate PWM signal and forwards this signal to transmit inhibit circuit 108. Transmit inhibit circuit 108 is a steering circuit which interleaves the outgoing auxiliary and outgoing data signals and supplies both to data and auxiliary signal transceiver 105 for transmission to the business communication system via the communication pair.

Thus, signal multiplexing circuit 110 functions to separate the incoming standard voice signals, incoming auxiliary signals, and incoming data signals from each other and apply these three separate signals to the appropriate EKT station set circuitry. Additionally, the outgoing standard voice signals, outgoing auxiliary signals, and outgoing data signals generated by the EKT station set are coded, interleaved with the incoming signals and applied to the communication pair by signal multiplexing circuit 110. Therefore, signal multiplexing circuit 110 functions to interface EKT station set 100 with the BCS system via a single pair of conductors.

DETAILED DESCRIPTION—FIGS. 3 THROUGH 7

Figure 2:
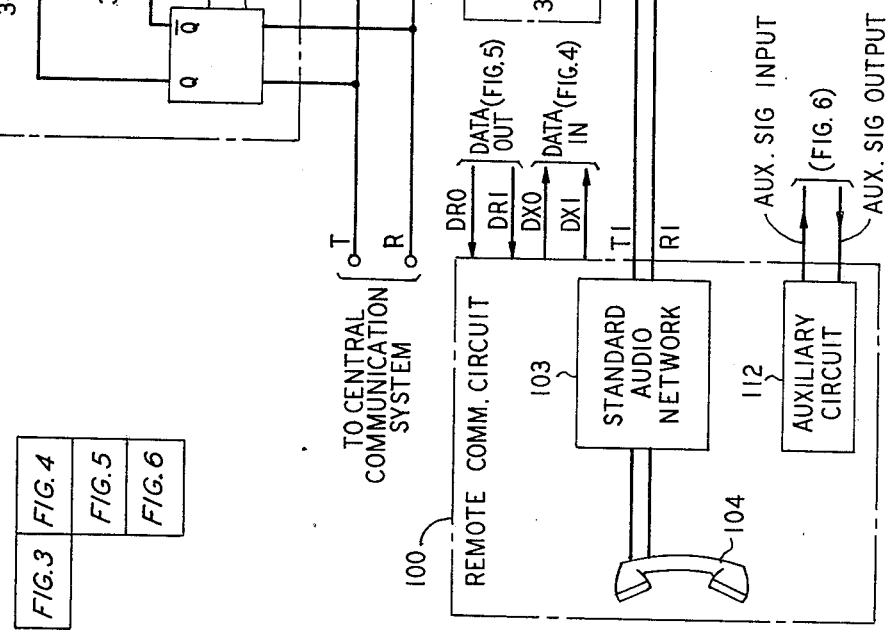
FIG. 2 shows the manner in which FIGS. 3-6 should be arranged.

The signal multiplexing circuit, as broadly described above and as shown in block diagram form in FIG. 1, is disclosed in further detail in FIGS. 3 through 6, which figures should be arranged as shown in FIG. 2.

Figure 3:
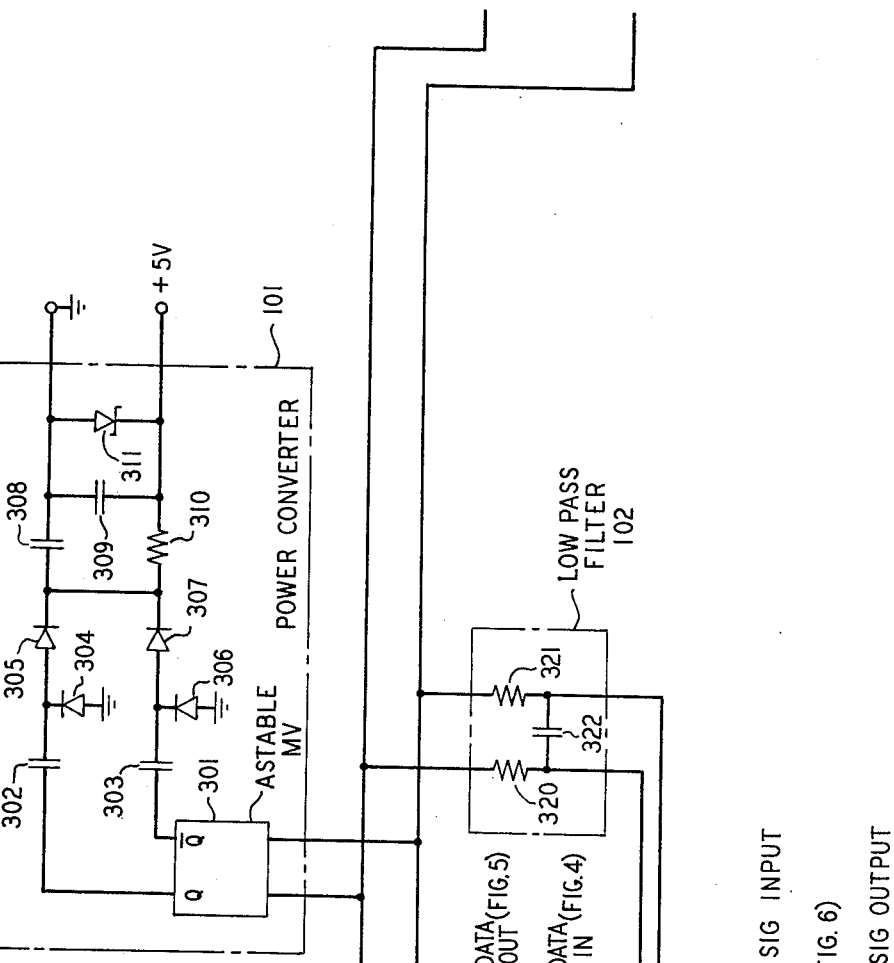
FIG. 3-6 show the details of the circuit illustrated in FIG. 1.

Power converter 101 in FIG. 3 is connected to the communication pair T,R which has impressed thereon the standard dc bias voltage associated with a telephone loop, which, for the purpose of this description, is assumed to be −48 volts on lead R and circuit ground on lead T. Astable multivibrator 301 in power converter 101 is connected to the communication pair and is powered by the aforementioned dc bias voltage appearing thereon. This dc bias voltage causes astable multivibrator 301 to oscillate, thereby producing a square wave voltage signal at output terminal Q and the 180 degrees out-of-phase square wave voltage signal at output terminal $\bar{Q}$. These square wave voltage signals are passed through capacitors 302 and 303 to half wave diode rectifiers 304–305 and 306–307 respectively and thence through a pi filter comprised of resistor 310 and capacitors 308 and 309. The filter output is then supplied to zener diode 311 which functions to establish the potential difference between the two output voltages which are assumed to be +5 volts and −5 volts respectively, which voltages are supplied to the remaining circuitry of signal multiplexing circuit 110.

As previously discussed, one of the signals appearing on the communication pair is the standard low frequency voice signal. This signal is separated from the other signals by low pass filter 102 which is comprised of resistors 320, 321 and capacitor 322. This standard low pass filter blocks the high frequency data and auxiliary signals appearing on the communication pair T,R from reaching standard audio network 103 and only passes the standard low frequency voice signals. Standard audio network 103 is the standard telephone network appearing in the EKT station set and typically serves to interface handset 104 with the communication pair, although in this case low pass filter 102 is interposed between standard audio network 103 and the communicaton pair as described above.

INCOMING SIGNAL WAVEFORMS — FIG. 7

Figure 7:
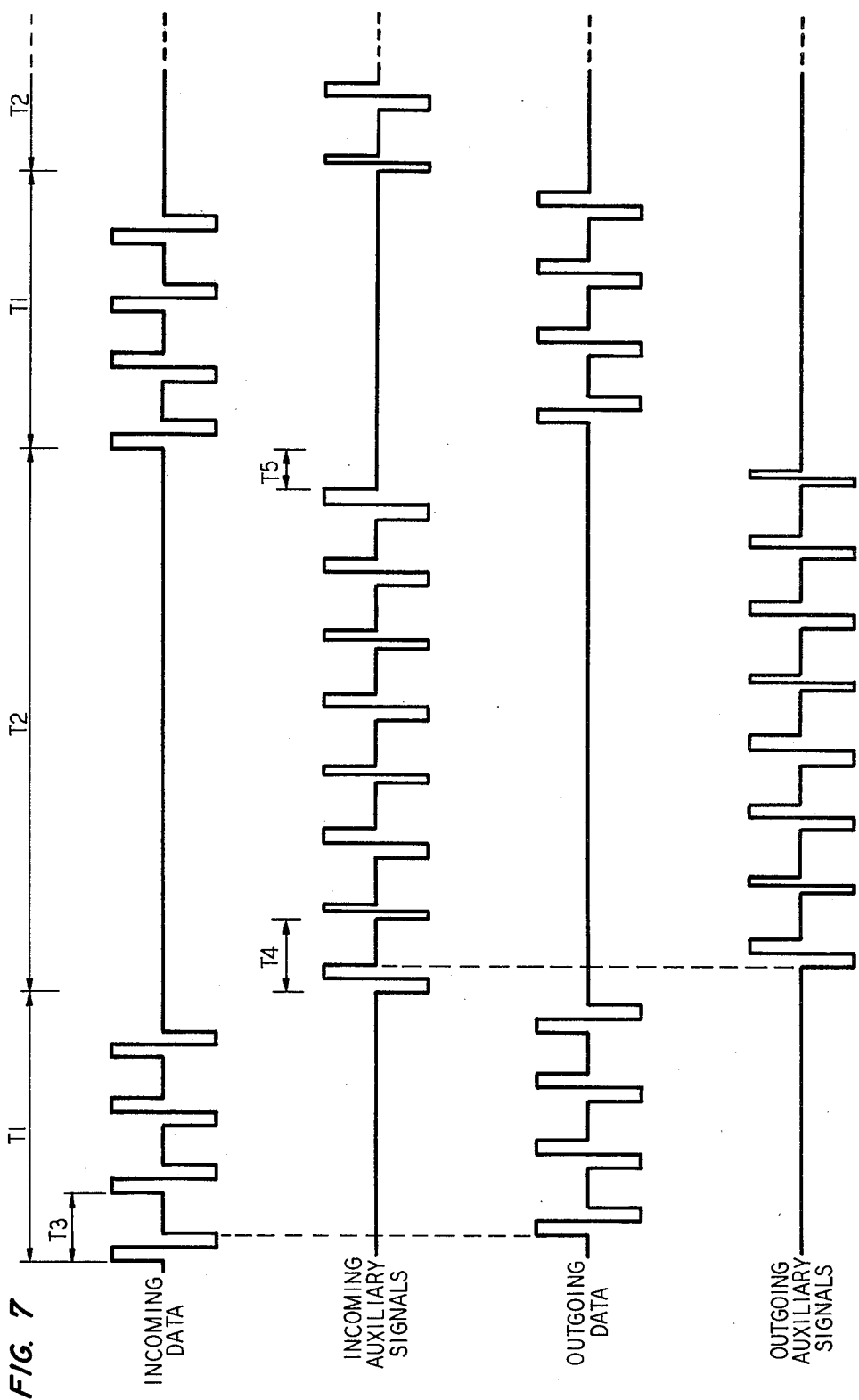
FIG. 7 shows typical voltage waveforms of the data and auxiliary signals.

At this juncture it is appropriate to discuss the voltage waveform of the signals appearing on the communication pair. FIG. 7 illustrates the voltage waveforms and the following description clarifies the relationship between the various signals. The first voltage waveform labelled as incoming data shows a typical incoming data message in idealized form. The actual voltage waveforms would not be perfectly square as shown but would actually appear somewhat sinusoidal due to the characteristic impedance of the communication pair. For the purpose of this description, however, all voltage waveforms will be considered as square wave signals. The incoming data message is, for the purpose of illustration, assumed to be a three bit message preceded by a guard bit. The guard bit is a leading positive pulse followed by an equal and opposite negative pulse thus distinguishing the data signals from the auxiliary signals which always provide a leading negative pulse followed by an equal and opposite positive pulse. When a positive lead pulse is detected, the signal appearing during the time period indicated as T1 on FIG. 7 will comprise the data message, which in this case is three bits with each bit being separated from the adjacent bit by some time period labelled as T3. These data messages appear periodically on the communication pair with the time period between the end of one message and the beginning of the next indicated by time period T2 on FIG. 7. Thus, during time period T2, no data message appears and this is when the auxiliary signals are transmitted on the communication pair.

The other incoming signal is the incoming auxiliary signal and the voltage waveform shown illustrates the typical PWM auxiliary signal appearing on the communication pair. The PWM signals are all single pulse pairs with a leading negative pulse followed by an equal and opposite positive pulse. The data content of the PWM pulse pairs is in the width of each segment of the pulse. This is illustrated in slightly exaggerated form by showing narrow and wide pulses on FIG. 7. These PWM pulse pairs appear periodically on the communication pair during time period T2 with the time period between adjacent pulses being given by time period T4 and the time between the last PWM pulse and the beginning of a data message being given by time period T5.

OUTGOING SIGNAL WAVEFORMS — FIG. 7

The outgoing signal waveforms are also shown on FIG. 7, with the first of these being labeled as "outgoing data." The outgoing data burst comprises the data transmission from EKT station set 100 to the BCS and is configured identical to the incoming data burst — three bits of data preceded by a guard bit pulse pair. Interface circuit 110 generates the outgoing guard bit pulse pair once the incoming guard bit has cleared the communication pair. Thus, interface circuit 110 acts as a "time hybrid," transmitting return signals only after the incoming signal has cleared the line. Thus, whenever an incoming pulse pair is received from the BCS, interface circuit 110 responds with a return pulse pair to the BCS.

The other outgoing pulse signal is also shown on FIG. 7, and is labeled as "outgoing auxiliary signals." The outgoing auxiliary signals are configured identical to the incoming auxiliary signals—bipolar pulse pairs of PWM with the negative half of the pulse pair leading. Signal multiplexing circuit 110 generates the outgoing auxiliary bipolar pulse pair signal once the incoming auxiliary bipolar pulse pair has cleared the line. Thus, signal multiplexing circuit 110 also acts as a "time hybrid" for auxiliary signals, separating the incoming and outgoing signals in time.

DATA AND AUXILIARY SIGNAL TRANSCEIVER 105

Figure 4:
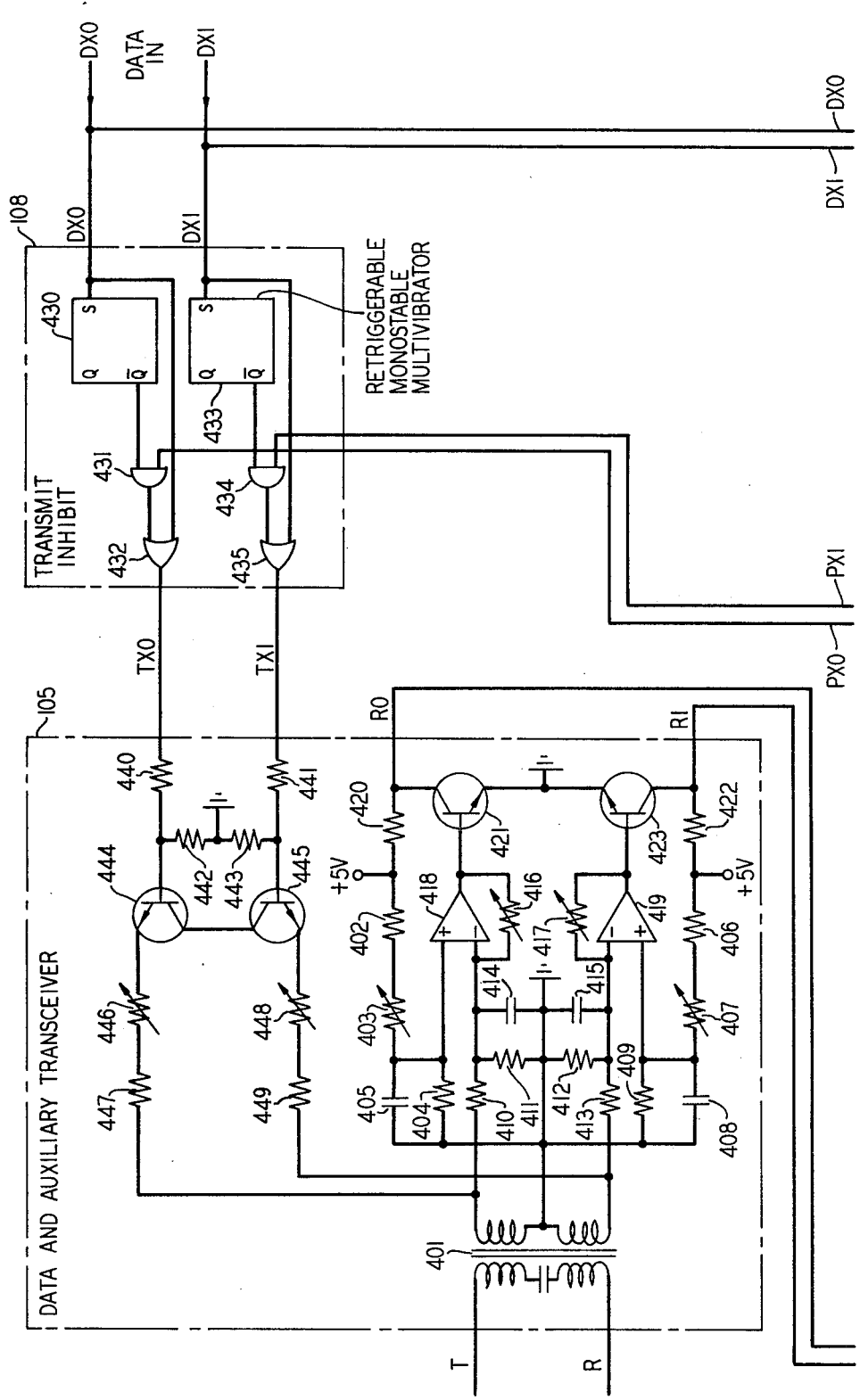
Figure 5:
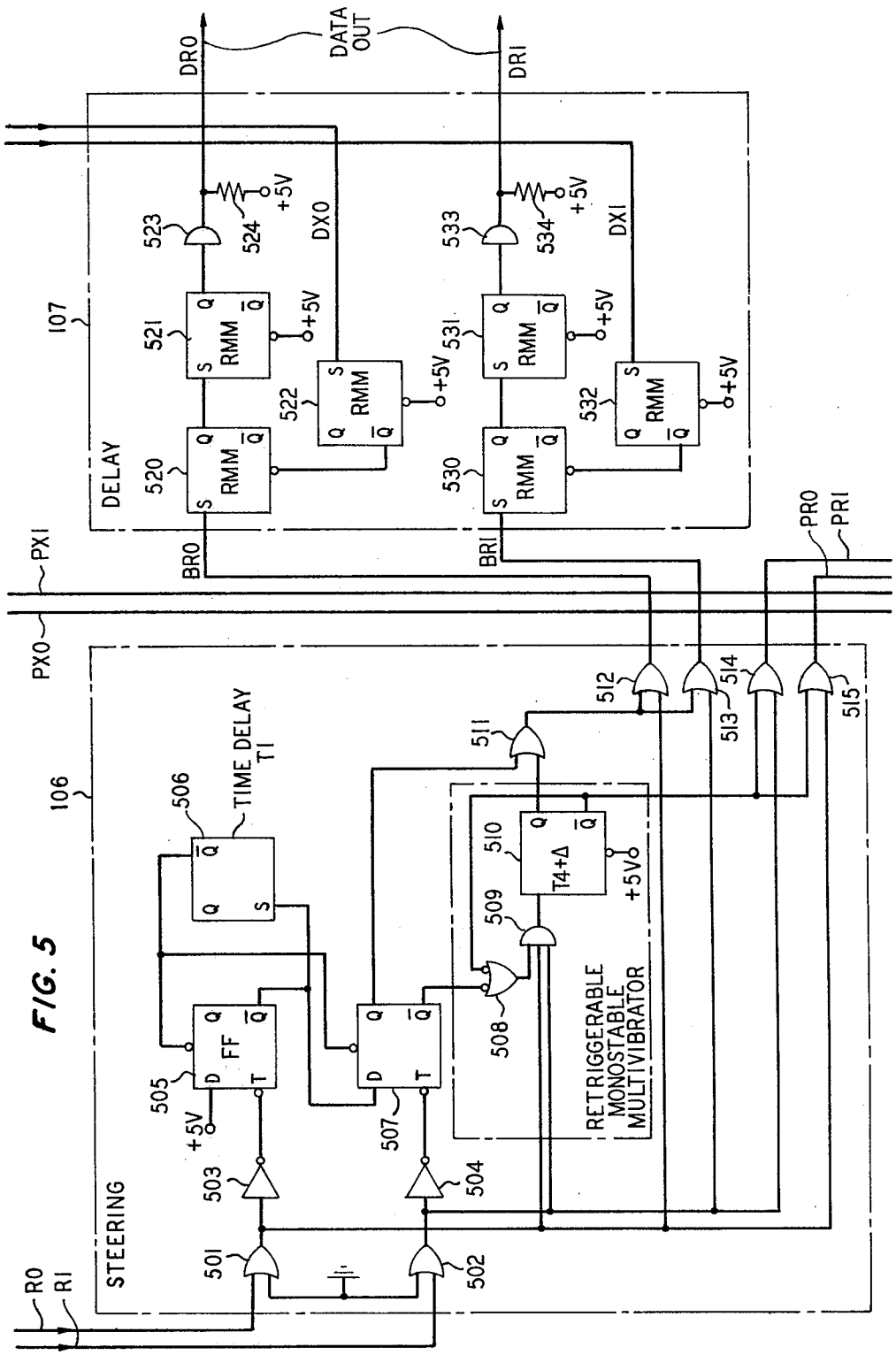

FIG. 4 illustrates the details of data and auxiliary signal transceiver 105. In particular, the receiver function will now be discussed as a typical incoming signal as described above is forwarded from the communication pair T,R through signal multiplexing circuit 110 to EKT station set 100. As discussed above, the data and auxiliary signals consist of pulse pairs of equal and opposite positive and negative pulses. These pulses appear on the communication pair T,R and are passed to the pulse detector circuitry of data and auxiliary signal transceiver 105 by transformer 401. The pulse detection circuitry comprises a voltage threshold generator comprised of resistors 402, 403, 404 and capacitor 405 which function to establish a threshold level for comparison with the pulse signals received from the communication pair. This threshold level is applied to the positive input terminal of comparator 418 while the received pulse passes through resistors 410, 411 and capacitor 414 to the negative input terminal of comparator 418. thus, a positive pulse appearing on the communication pair is passed through transformer 401 to the negative input terminal of comparator 418 where it is compared to the voltage threshold and, if the received pulse exceeds this threshold level, comparator 418 turns on, activating transistor 421 which places a pulse signal on lead R0. Identical pulse detection circuitry comprised of resistors 406, 407, 409, 412, 413, 417, 422 capacitors 408, 415 comparator 419 and transistor 423 is associated with lead R1 and functions in similar fashion to detect negative pulses appearing on the communication pair. When a negative pulse is detected an associated signal is placed on lead R1.

Thus, data and auxiliary signal transceiver 105 detects valid pulse pairs and passes a positive pulse signal to lead R0 and a negative pulse signal to lead R1 and thence to steering circuit 106. Steering circuit 106 comprises logic and timing circuitry which functions to discriminate between received data and received auxiliary signals, switching these signals to the appropriate output conductors. In particular, a pulse pair appearing on leads R0 and R1 is passed through isolation gate pairs 501/503 and 502/504 to flip-flops 505 and 507. If a positive pulse appears first, flip-flop 505 is set thereby preventing flip-flop 507 from being set and also starting time delay 506 to time. The Q output of flip-flop 507 is low, thereby holding gate 511 low. The low output of gate 511 enables gates 512 and 513 which gates, therefore, pass whatever signals appear on their inputs to leads BR0 and BR1, respectively. Thus, a data signal with its leading positive pulse guard bit sets flip-flops 505 and 507 which enable gates 512, 513 to pass the signal appearing on leads R0 and R1 to leads BR0 and BR1 for the time period determined by the time constant of time delay 506, which time constant is established to be the length of the data message, time period T1. Meanwhile, gates 514 and 515 are disabled, preventing the signals appearing on leads R0 and R1 from being transmitted to leads PR0 and PR1.

At the end of the data burst period T1, incoming PWM auxiliary signals appear on leads R0 and R1. The auxiliary signal pulse pair begins with a leading negative pulse which sets flip-flop 507 before flip-flop 505 is set. The high signal appearing on the Q output of flip-flop 507 disables gate 511, thereby disabling gates 512 and 513. Meanwhile, retriggerable monostable multivibrator comprised of gates 508, 509 and timing circuit 510 is triggered thereby enabling gates 514 and 515 while maintaining gates 511, 512 and 513 disabled. Thus, auxiliary signal pulse pairs appearing on leads R0 and R1 are switched by steering circuit 106 to leads PR0 and PR1. The retriggerable monostable multivibrator remains active for a time period of (T4+Δ). This assures that as long as PWM auxiliary signal pulse pairs appear on leads R0 and R1, gates 514 and 515 will be enabled. However, when no PWM auxiliary signal pulse pairs appear for a time greater than T4+Δ, the entire circuit is reset, blocking transmission through gates 514 and 515 while enabling transmission through gates 512 and 513 in anticipation of the data message that is about to arrive.

PULSE WIDTH DEMODULATOR 109

Figure 6:
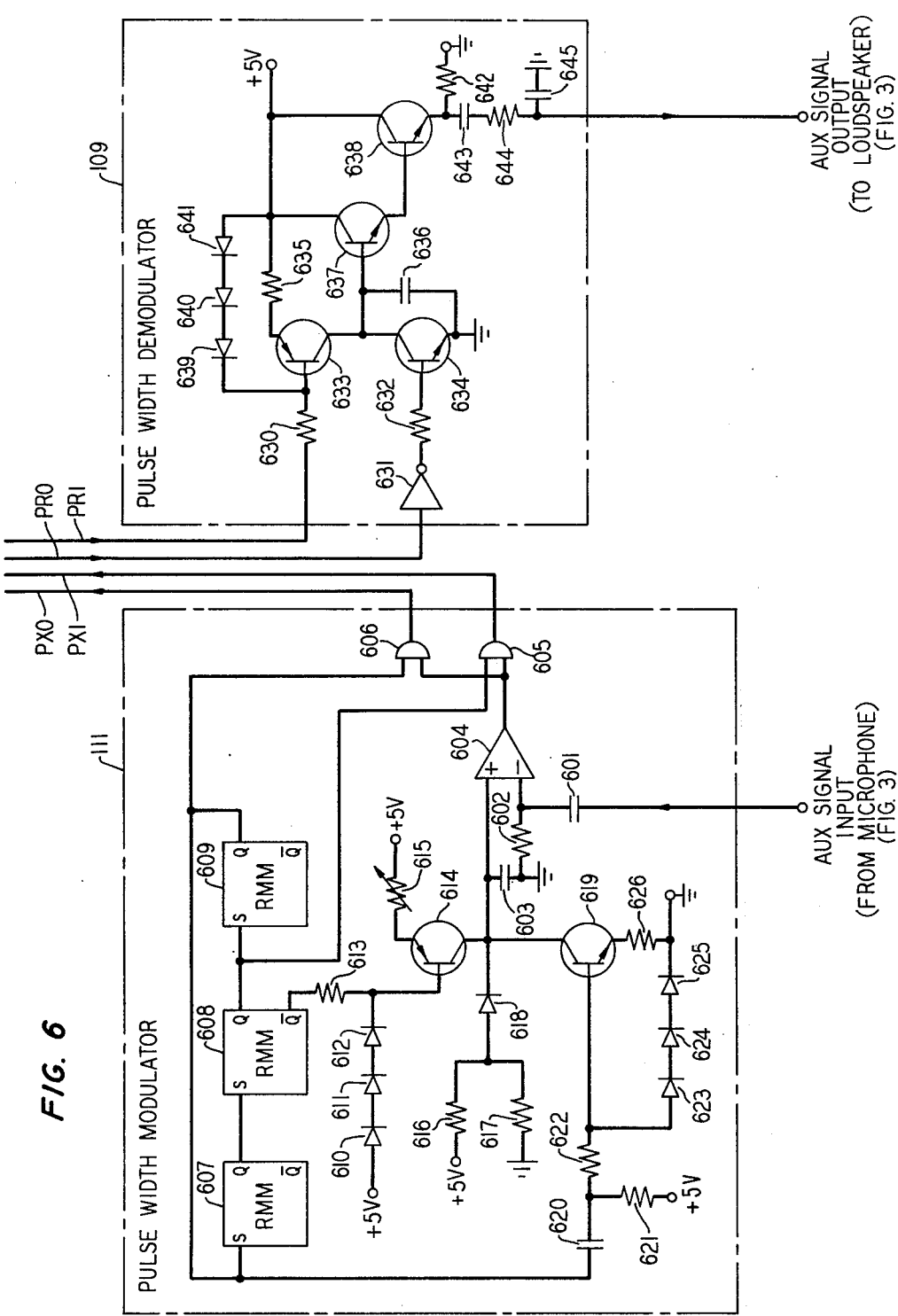

Thus, if the incoming pulse pairs are determined to be auxiliary signals, gates 514 and 515 of steering circuit 106 are enabled and the received pulse pairs are switched to leads PR0 and PR1 which carry the received auxiliary signal pulse pairs to pulse width demodulator 109 as shown on FIG. 6. Pulse width demodulator 109 comprises a simple demodulation circuit wherein transistor 633 is switched on by the presence of a negative leading pulse appearing on lead PR1. Transistor 633 on causes capacitor 636 to charge to +5 volts through resistor 635. As the voltage on capacitor 636 increases, a level will be reached wheel transistors 637, 638 turn on and charge capacitor 643. At the termination of the pulse appearing on lead PR1, an equal and opposite pulse will appear on lead PR0, switching on transistor 634 thereby discharging capacitor 636, and turning off transistors 637, 638. Thus, the width of the incoming PWM pulses determine how long transistor 633 is on and thus how much charge is stored on capacitor 636. The signal appearing on capacitor 636 in turn establishes the length of time that transistors 637, 638 are on, thereby setting the voltage on capacitor 643. This last mentioned voltage is filtered by resistor 644-capacitor 645 combination and the resultant auxiliary signal is applied to the loudspeaker (not shown) associated with EKT station set 100.

DELAY 107

The data burst pulse pair signals are switched by steering circuit 106 to delay circuit 107 via leads BR0, BR1. Delay circuit 107 prevents the shifting of data into the EKT station set logic circuitry while data is being transmitted by the EKT station set to the BCS. Retriggerable monostable multivibrators 522, 532 are triggered by outgoing data signals and function to hold retriggerable monostable multivibrators 520, 530 reset until the transmitted pulse pair is completed. This prevents the outgoing pulse pairs from being erroneously fed back through steering circuit 106 to leads BR0, BR1. At the time that the transmitted pulse pair is complete, retriggerable monostable multivibrators 520, 521, 530, 531 can be triggered by incoming data signals and these received signals are then transmitted by gates 523, 533 to the EKT station set logic circuitry (not shown) via lead DR0, DR1.

DATA OUTPUT

Meanwhile, as discussed above in reference to the outgoing signal waveforms, data signals are being transmitted back to the BCS. This is accomplished by the EKT station set logic circuit providing the outgoing data to signal multiplexing circuit 110 via leads DX0, DX1. Transmit inhibit circuit 108 receives this data which triggers retriggerable monostable multivibrators 430, 433. The Q̄ outputs retriggerable monostable multivibrators 430, 433 drive logic gates 431, 432 and 434, 435 respectively. The outut pulse pair from transmit inhibit circuit 108 is applied to data and auxiliary signal transceiver 105 via leads TX0, TX1. Resistors 440–443, 446–449, transistors 444, 445 comprise a balanced line driver which is responsive to the pulse pair appearing on leads TX0, TX1 and which transmits the pulse pair to the BCS on communication pair T,R by driving transformer 401.

AUXILIARY SIGNAL OUTPUT

Outgoing auxiliary signals generated by the EKT station set auxiliary microphone (not shown) are supplied to pulse width modulator 111. Retriggerable monostable multivibrator 607 establishes the auxiliary signal transmission repetition rate, time period T4. Thus, retriggerable monostable multivibrator 607 on activates retriggerable monostable multivibrator 608 which, in turn, enables gate 605 for a time period of one-half T6, the maximum width of an outgoing PWM pulse, and also turns on transistor 614, charging capacitor 603. Capacitor 603 continues to charge until it reaches the voltage level equal to that of the auxiliary signal input. At that time, comparator 604 is triggered, turning on gate 605 for the duration of the time period of retriggerable monostable multivibrator 608. The time period of multivibrator 608 is one-half of T6, the maximum width of a PWM outgoing pulse. Therefore, the width of the pulse generated by gate 605 is equal to one-half of T6 minus the charging time of capacitor 603, and therein lies the information content of the pulse. Once retriggerable monostable multivibrator 608 times out, it activates retriggerable monostable multivibrator 609 which then enables gate 606 and transistor 619. Transistor 619 discharges capacitor 603 at the same rate as it was charged and when the voltage on capacitor 603 equals that of the outgoing auxiliary signal, comparator 604 turns off, turning off gate 606. Therefore, two equal duration pulses are generated, with one being applied to lead PX1 and the subsequent one being applied to lead PX0 to form a PWM auxiliary signal pulse pair. This outgoing auxiliary signal pulse pair is switched, as described above, by transmit inhibit circuit 108 to data and auxiliary signal transceiver circuit 105 which transmits this signal to the BCS via communication pair T,R.

While a specific embodiment of the invention has been disclosed, variations in procedural and structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

I claim:

1. A signal multiplexing circuit for concurrently transmitting outgoing voice signals, outgoing data, outgoing encoded auxiliary signals and receiving corresponding and identically formatted incoming voice signals, incoming data, incoming encoded auxiliary signals on a communication path comprising a single pair of wires, wherein said signal multiplexing circuit comprises:
 encoding means for coding said outgoing auxiliary signals into pulse coded signals;
 isolation means for separating said outgoing voice signals from both said outgoing data and said outgoing encoded auxiliary signals in frequency;
 receiving means for concurrently receiving said incoming voice signals, said incoming data and said incoming encoded auxiliary signals;
 separation means for separating said incoming voice signals from both said incoming data and said incoming encoded auxiliary signals;
 steering means for separating said outgoing data, said outgoing encoded auxiliary signals, said incoming data and said incoming encoded auxiliary signals in time;
 decoding means for translating said incoming encoded auxiliary signals into analog signals; and
 transmitting means for transmitting said separated outgoing voice signals, outgoing data and outgoing encoded auxiliary signals on said single pair of wires.

2. The invention of claim 1 wherein said steering means includes:
 time division means for separation said outgoing data from said outgoing encoded auxiliary signals in time;
 incoming steering means for isolating said incoming data from said incoming encoded auxiliary signals in time; and
 transmit inhibit means for separating said outgoing data and said outgoing encoded auxiliary signals from both said incoming data and said incoming encoded auxiliary signals in time.

3. The invention of claim 2 wherein said outgoing data and said incoming data comprise pulse code modulation bipolar pulse pairs.

4. The invention of claim 2 wherein said outgoing encoded auxiliary signals and said incoming encoded auxiliary signals comprise pulse width modulation bipolar pulse pairs.

5. The invention of claim 4 wherein said encoding means comprises pulse width modulation means for transforming said outgoing auxiliary signals into pulse width modulation bipolar pulse pairs; and
 wherein said decoding means comprises pulse width demodulation means for transforming said incoming encoded auxiliary signals into analog auxiliary signals.

6. A signal multiplexing system for use between a central communication system and a remote communication circuit for concurrently transmitting voice signals, data and encoded auxiliary signals bidirectionally between said remote communication circuit and said central communication system via a communication path which comprises a single pair of wires, wherein said signal multiplexing system comprises an interface circuit for connecting said remote communication circuit to said single pair of wires and for connecting said central communication system to said single pair of wires, wherein said interface circuit comprises:
- encoding means for coding outgoing said encoded auxiliary signals into pulse coded signals;
- receiving means for concurrently receiving said incoming voice signals, said incoming data and said incoming encoded auxiliary signals;
- isolation means for separating said voice signals from both said data and said encoded auxiliary signals;
- steering means for separating both incoming and outgoing said data and said encoded auxiliary signals from each other in time;
- transmitting means for concurrently transmitting outgoing said separated voice signals, data and auxiliary signals on said single pair of wires; and
- decoding means for translating said incoming encoded auxiliary signals into analog signals.

7. A signal multiplexing circuit for concurrently transmitting voice signals, data and auxiliary signals and receiving corresponding and identically formatted incoming voice signals, incoming data, incoming auxiliary signals on a communication path comprising a single pair of wires, wherein said signal multiplexing circuit comprises:
- encoding means for coding said auxiliary signals into pulse coded signals;
- isolation means for separating said voice signals from both said data and said encoded auxiliary signal in frequency;
- receiving means for concurrently receiving said incoming voice signals, said incoming data and said incoming encoded auxiliary signals;
- separation means for separating said incoming voice signals from both said incoming data and said incoming encoded auxiliary signals;
- transmitting means for concurrently transmitting said voice signals, said data and said encoded auxiliary signals on said single pair of wires; and
- steering means for separating said data and said encoded auxiliary signals from said incoming data and said incoming encoded auxiliary signals in time, wherein said steering means includes time hybrid means for switching said encoded auxiliary signals to said transmitting means between adjacent received said incoming encoded auxiliary signals and for switching bits of said data to said transmitting means between adjacent received bits of said incoming data.

* * * * *